United States Patent
Huang et al.

(10) Patent No.: US 12,213,124 B2
(45) Date of Patent: Jan. 28, 2025

(54) TIERED SSB BASED RADIO RESOURCE MANAGEMENT FOR RADAR COEXISTENCE

(71) Applicant: INTERDIGITAL PATENT HOLDINGS, INC., Wilmington, DE (US)

(72) Inventors: Joe Huang, Montville, NJ (US); Philip Pietraski, Jericho, NY (US); Sudhir Pattar, Mount Laurel, NJ (US); Alpaslan Demir, East Meadow, NY (US); Joseph Murray, Schweksville, PA (US); Patrick Cabrol, Bayshore, NY (US); Muhammad Fazili, Audubon, PA (US); Tariq Elkourdi, New York, NY (US); Paul Russell, Lawrence, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 339 days.

(21) Appl. No.: 17/895,284

(22) Filed: Aug. 25, 2022

(65) Prior Publication Data
US 2023/0209528 A1    Jun. 29, 2023

Related U.S. Application Data

(60) Provisional application No. 63/238,117, filed on Aug. 28, 2021.

(51) Int. Cl.
*H04W 72/12* (2023.01)
*G01S 7/02* (2006.01)

(52) U.S. Cl.
CPC ............. *H04W 72/12* (2013.01); *G01S 7/023* (2013.01); *G01S 7/0234* (2021.05); *G01S 7/0236* (2021.05)

(58) Field of Classification Search
CPC ...... G01S 7/0236; G01S 7/0234; G01S 7/023; H04W 72/12
See application file for complete search history.

(56) References Cited

U.S. PATENT DOCUMENTS

| | | | |
|---|---|---|---|
| 2020/0127907 A1* | 4/2020 | Koo | H04W 24/04 |
| 2021/0195435 A1* | 6/2021 | Rimini | H04B 1/3838 |
| 2021/0231771 A1* | 7/2021 | Bengtsson | H04B 7/06966 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

(Continued)

*Primary Examiner* — Peter M Bythrow
(74) *Attorney, Agent, or Firm* — Volpe Koenig

(57) ABSTRACT

A method, system and apparatus are described for implementing a tiered SSB framework for radar coexistence. A tiered-SSB based radio resource management may be implemented. Tiered-SSB based radio resource management are implemented in downlink and/or uplink.

20 Claims, 7 Drawing Sheets

(56) References Cited

OTHER PUBLICATIONS

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).

* cited by examiner

TIERED SSB BASED RADIO RESOURCE MANAGEMENT FOR RADAR COEXISTENCE

CROSS-REFERENCE TO RELATED APPLICATIONS

This application claims the benefit of U.S. Provisional Application No. 63/238,117 filed Aug. 28, 2021, the contents of which are incorporated herein by reference.

BACKGROUND

Advanced network standards, including 5G New Radio (NR) standards do not typically specify practical network embodiments that can operate in highly congested and contested spectral environments in which transceivers are vulnerable to jamming and in which non-telecommunications equipment such as radar transceivers propagate energy in bands used by advanced networks. Yet, this is the environment in which such advanced networks are deployed. Systems apparatus and methods are needed by which devices and systems implementing advanced networking technologies such as 5G technologies can operate optimally while coexisting with devices and systems that propagate energy in the same bands used by the networks, without the networks interfering with the propagated energy, and vice versa.

SUMMARY

Embodiments disclosed and described herein provide systems apparatus and methods by which devices and systems implementing advanced networking technologies such as 5G can operate within an advanced network, while coexisting with non-telecommunications devices and systems that propagate energy in bands used by the 5G capable systems and devices. In particular systems, apparatus and methods disclosed herein mitigate the risk of 5G networks and devices interfering with the energy propagated by the non-telecommunications devices.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
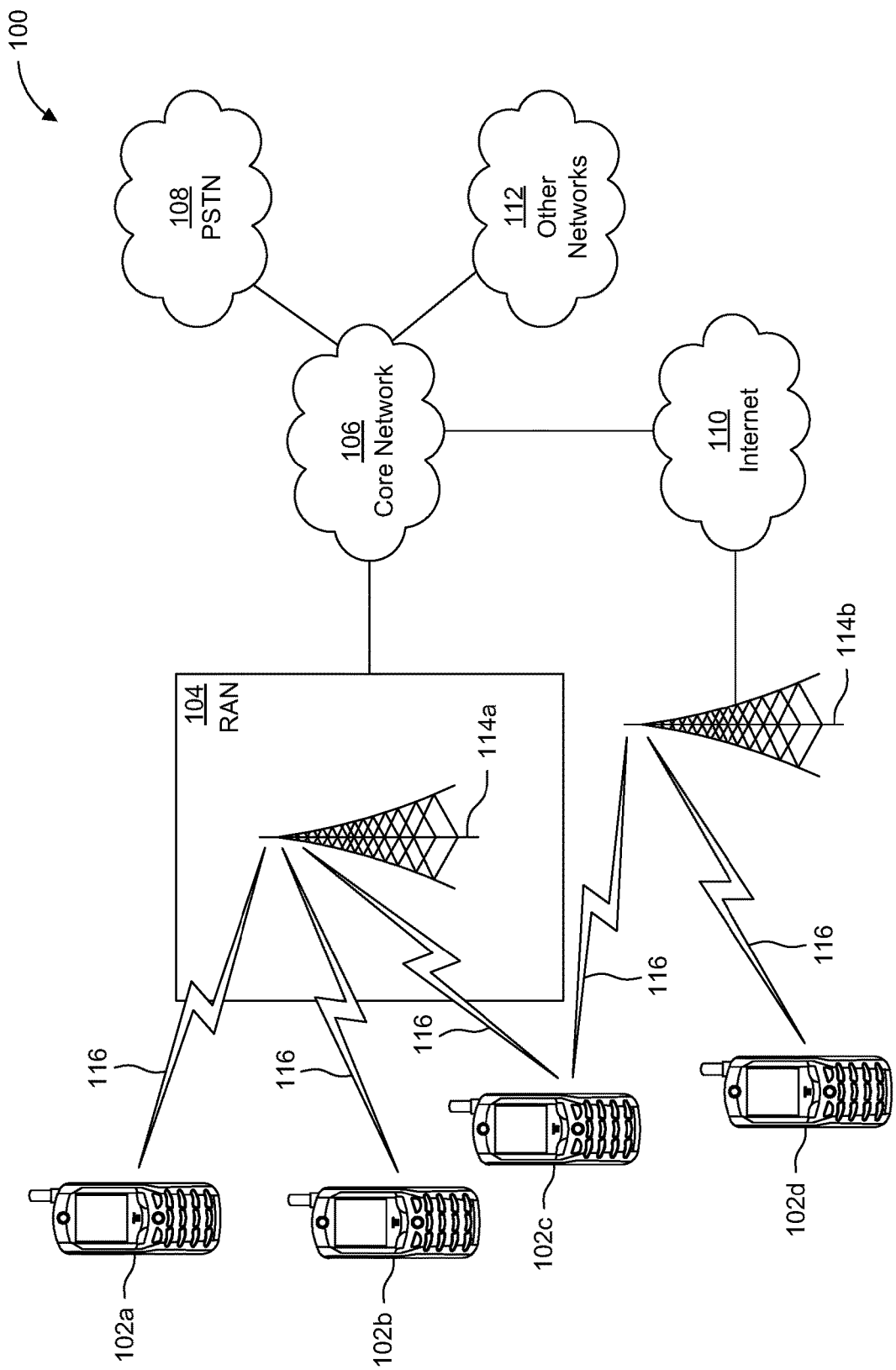
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
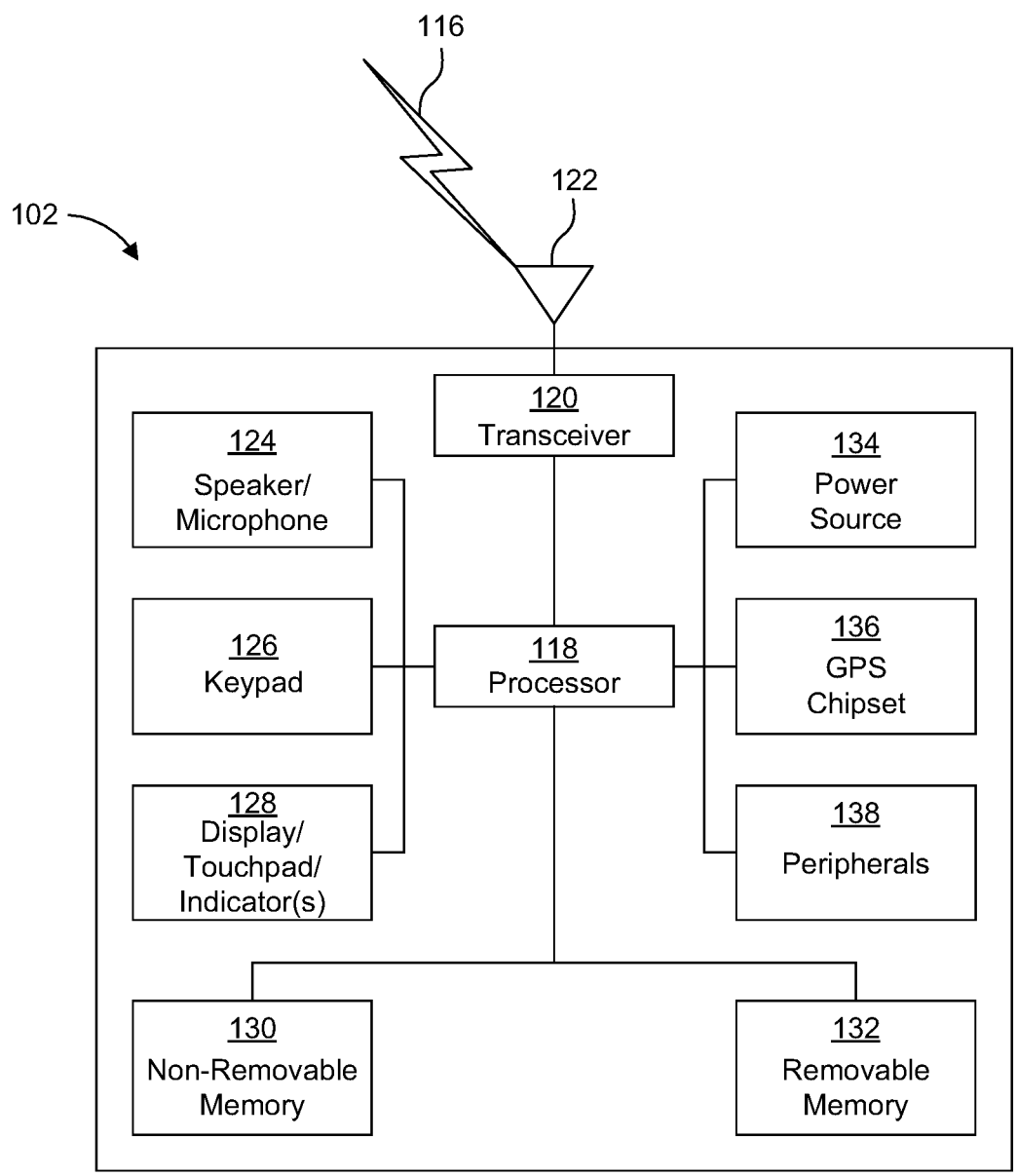
FIG. 1B is a system diagram illustrating an example wireless transmit/receive unit (WTRU) that may be used within the communications system illustrated in FIG. 1A according to an embodiment.
Figure 1C:
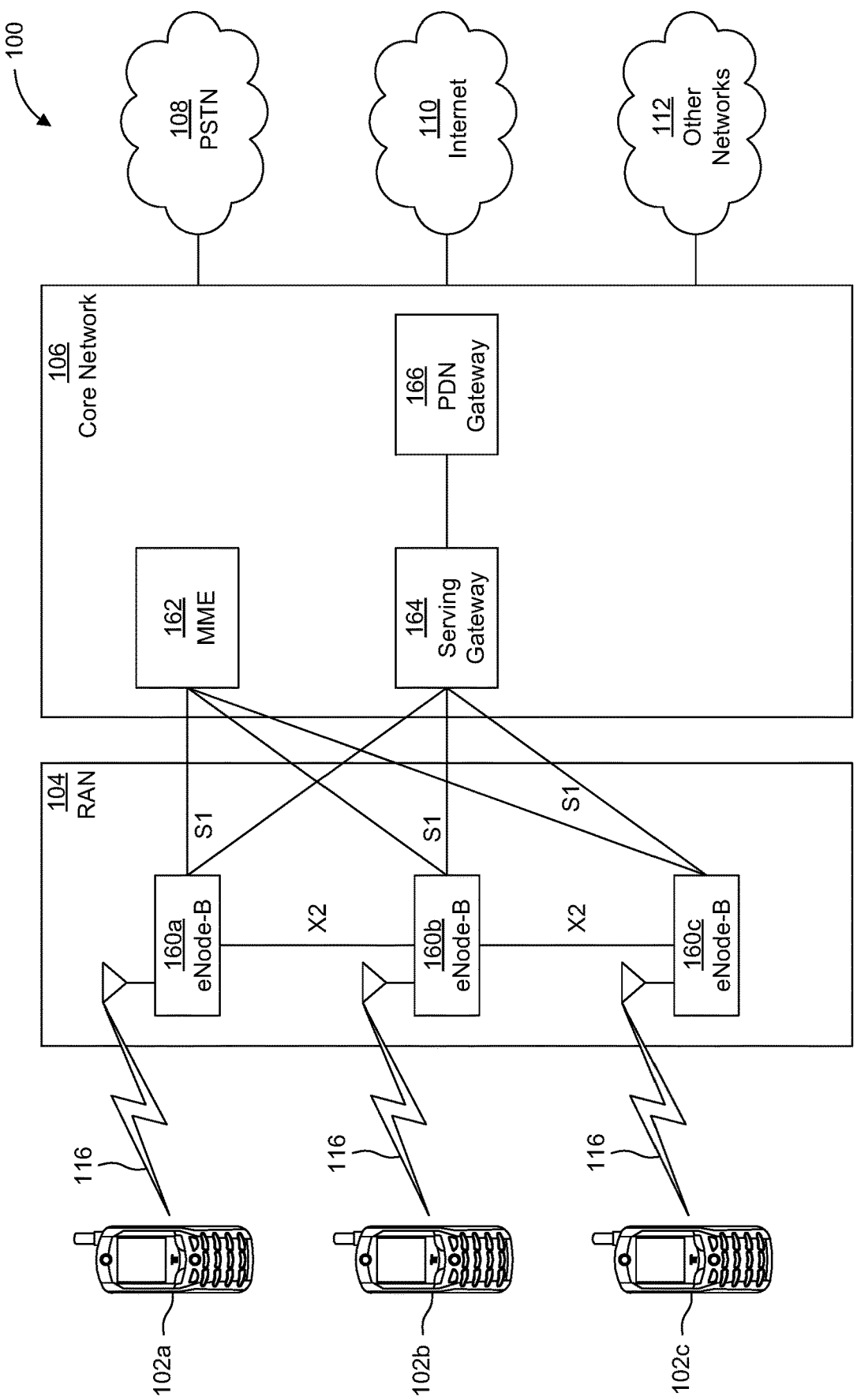
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
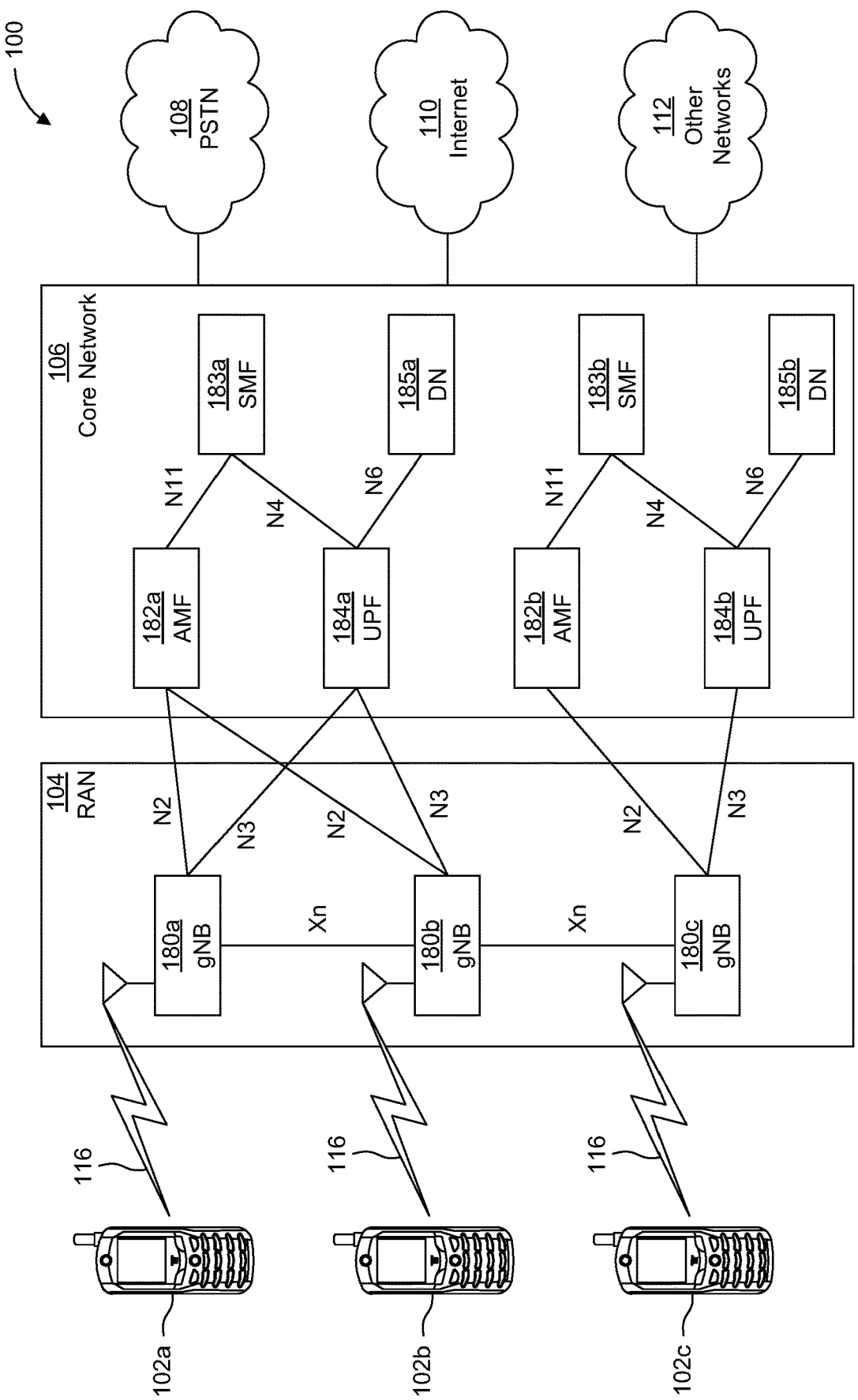
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Below is a list of definitions and abbreviations which may be used in the description provided herein.
  3GPP Third Generation Partnership Project
  5G $5^{th}$ Generation
  AOA Angle of Arrival
  CSI Channel State Information
  CSI-RS Channel State Information Reference Signal
  DCI Downlink Control Information
  FR1 Frequency Range 1
  gNB NR NodeB
  MAC Medium Access Control
  MAC-CE MAC Control Element
  MCS Modulation and Coding Scheme
  NR New Radio
  OAM Operation, Administration and Maintenance
  PDCCH Physical Downlink Control Channel
  PDSCH Physical Downlink Shared Channel
  PUSCH Physical uplink Shared Channel
  PHY Physical Layer
  RADAR Radio Detection and Ranging
  PRB Physical Resource Block
  RRC Radio Resource Control
  SINR Signal to Interference plus Noise Ratio
  SSB SS/PBCH block
  TPC Transmit Power Control
  UE User Equipment A salient feature of 5G NR is its intrinsic beam-based design and massive MIMO. Examples include the introduction of the SSB (Synchronization Signal Block) beam for initial access and the use of CSI-RS for beam refinement. The beam-based design allows more focused transmission and reception of the signal while reducing the resulting interference in other directions. In this regard, the focused beam emanated from the gNB may result in significant interference to radar when it is pointing in the radar antenna direction, as well as receiving significant interference from the radar when the radar is pointing at the gNB.

In addition, the interference from airborne radar is also highly directional and highly dynamic since the radar beam can sweep in both azimuth direction and elevation direction. A coexistence strategy needs to efficiently manage the dynamic interaction between the beam-based NR system and highly directional high power radar interference to ensure that the interference level from NR to radar is kept at an acceptably low level to meet the mandate from the radar operator, while managing the interference from the radar to the NR system to maintain robust and efficient NR operation.

When a 5G NR system coexists with an incumbent radar operator, it is imperative to ensure that the interference level from NR to radar is kept at an acceptably low level, while managing the interference from the radar to the NR system to maintain the NR operation. The level of interference from radar to a gNB (and its associated UEs) depends on the distance (among other factors such as terrain) between the radar and the gNB.

Since the effective radiated power of the radar is much larger than that of the gNB and the UE, it is expected that when an airborne radar is approaching the NR system from far away, there will be a period when the radar interference to gNB is significant enough to affect NR system operation but the aggregate NR interference to the radar is still below an acceptable threshold. During this period, the main coexistence strategy is to mitigate the interference from the radar.

As the airborne radar further approaches the gNB, the interference from the gNB and/or UE to the radar can become unacceptably high. In this situation, coexistence strategy also needs to ensure the NR system does not create harmful interference to the radar while continuing to operate at a degraded capacity.

An effective way to mitigate the interference from the radar is to perform beam nulling toward the radar direction while pointing the main beam to the targeted UEs. Example beam nulling approaches include null steering or zero-forcing. As a result, the radar interference to the NR system can be mitigated for the NR uplink operation.

In embodiments, beam nulling can be performed in the azimuth direction when the azimuth direction of the UE (relative to its serving gNB) is not very close to the azimuth direction of the radar (relative to the same gNB), or in the elevation direction when the elevation direction of the UE is not very close to the elevation direction of the radar. Otherwise, the desired signal strength will also be significantly reduced when attempting to null out the radar interference.

When the airborne radar is far away, it is expected that the elevation angle of the radar (as measured from the ground) is very close zero. In the NR system, UEs near the cell edge will have a much smaller elevation angle (relative to its serving gNB) than those close to the cell center. In this regard, only UEs in the inner cell region may be subject to effective beam nulling in the elevation direction. Therefore, for UEs in the outer cell region, only azimuth beam nulling should be performed, while for UEs in the inner cell region, beaming nulling can be performed in either azimuth, elevation or simultaneously in both azimuth and elevation direction to achieve the best nulling results. In this regard, it would be beneficial for gNB to automatically identify whether a UE is in the inner cell region or outer cell region to facilitate the most efficient beam nulling strategy.

As the airborne radar further approaches the gNB, the interference from the gNB to the radar becomes unacceptable without additional mitigation measures, and the interference from the radar to the NR system becomes even stronger. In certain embodiments, one strategy is to avoid the mutual interference between NR system and radar via restricted scheduling (a.k.a. PRB blanking) over the detected radar sweeping bandwidth.

However, the interference from radar to the NR system can be so strong that not only the radar signal within the radar sweeping bandwidth can interfere with the NR system, but the radar signal outside of the radar sweeping bandwidth can also introduce significant interference to the NR system. In this case, PRB blanking on the radar sweeping bandwidth is not sufficient to support NR coexistence with radar. Additional mitigation steps need to be taken to alleviate the interference from the radar to the NR system.

In embodiments the afore-mentioned beam nulling strategy can also be applied on the PRBs with detected radar interference outside of the radar sweeping bandwidth. On the uplink, beam nulling can be applied to reduce the interference from the radar on any affected PRBs (outside of the blanked PRBs). In addition, beam nulling can also be used to reduce the interference from gNB to the radar, as needed. Note that the interference from the UE to radar outside of the detected radar sweeping bandwidth is assumed to be of secondary concern, due to its presumably less transmission power.

In embodiments, a tired SSB approach can help facilitate efficient beam nulling and restricted scheduling/PRB blanking by differentiating the inner cell UEs versus outer cell UEs, and the proximity of azimuth direction of any UE to the azimuth angle of arrival direction of the radar.

In addition to beam nulling and restricted scheduling/PRB blanking, several other radio resource management procedures can also benefit from the tiered SSB architecture.

Due to the much smaller path loss, UEs in the inner tier SSB are more likely to have extra power headroom that can be used to overcome radar interference. The additional power transmitted from the UEs in the inner SSB tier should not create significant additional inter-cell interference, due to the relative long distance from inner tier UEs to other gNBs. gNBs can utilize this property to employ a tiered uplink power control strategy. On the other hand, for UEs in the outer SSB tier, radio resource management features such as PUSCH aggregation can be employed to mitigate radar interference. In addition, a more conservative MCS can be selected during link adaption to further improve the robustness of the wireless radio link.

Similarly, on the downlink, the corresponding radio resource management strategy such as lower MCS, PDSCH aggregation, and more conservative PDCCH aggregation level can be used to combat radar interference. Due to the much smaller pathloss, UEs in the inner SSB tier will receive higher power on all downlink channels than those in the outer SSB tier. As a result, the amount of overhead required to exercise the above radio resource management strategy for link robustness can be reduced for the UEs in the inner SSB UEs to achieve higher throughput.

Tiered SSB Framework

In embodiments, a tiered-SSB framework for radar coexistence is provided wherein the NR SSB beams are structured into multiple tiers to facilitate efficient radio resource management during radar coexistence. In embodiments, a tier corresponds with a particular elevation angle which in turn corresponds to a different coverage radius in a cell. In embodiments, the azimuth beamwidth of different tiers is set independently whereas the azimuth beamwidth within each tier is nominally the same. In embodiments, SSB beams in the inner tier(s) are constructed with a null in the (near) horizontal direction for radar coexistence. UEs in the inner SSB tier that uses a wider SSB beamwidth further applies NR beam management procedure 2 (P2) to provide refined azimuth resolution of the UE direction (via CSI-RS beams) to facilitate efficient radio resource management during radar coexistence.

Figure 2:
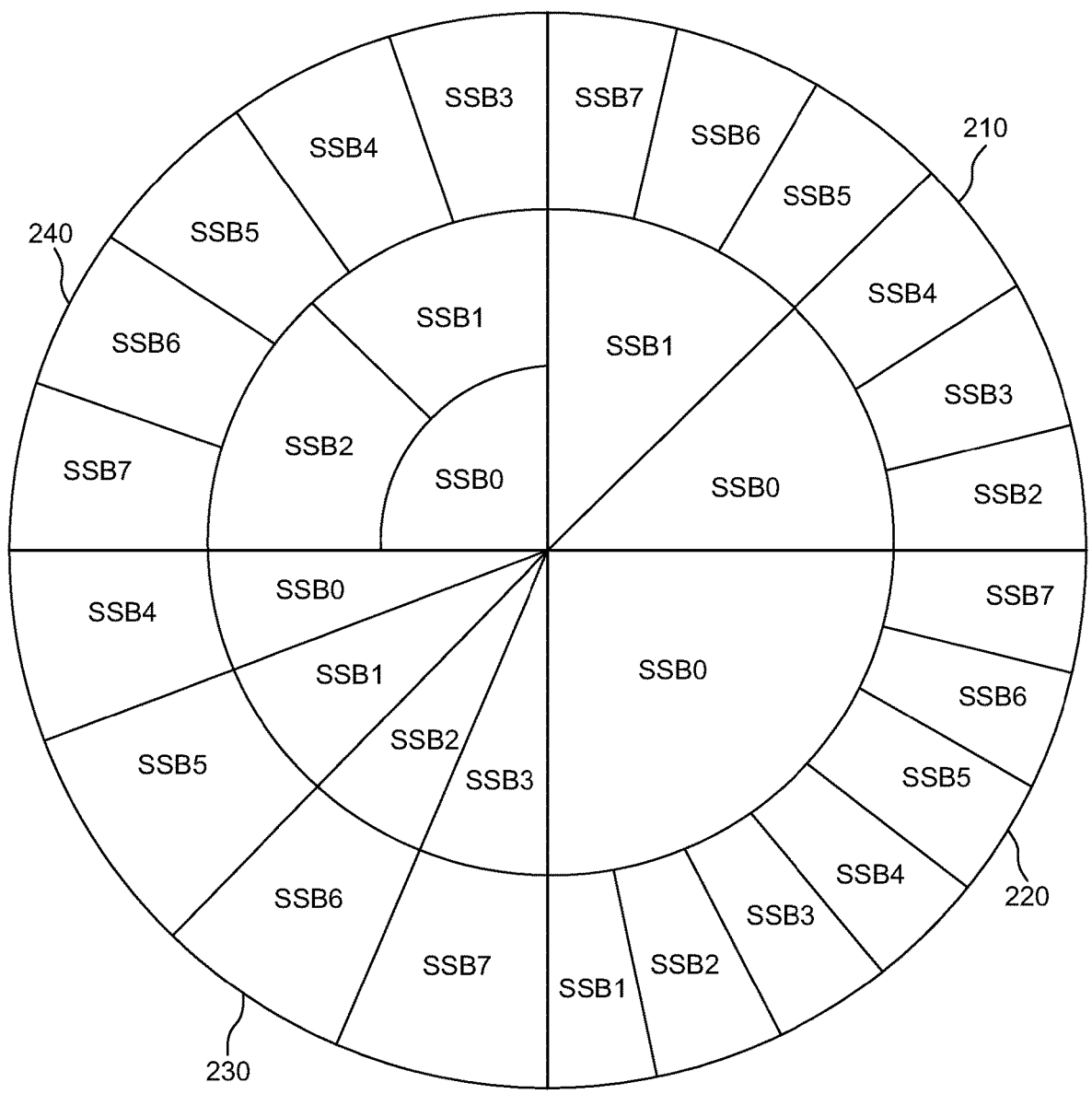
FIG. 2 shows tiered SSB examples.

In NR, SSB based beam sweeping is used during initial access by the UE to choose the best beam. A UE measures the beam strength by measuring received signal power. The best SSB beam identified by the UE is informed to the gNB. In principle, in embodiments different SSB beams point to different azimuth and/or elevation directions over the full coverage areas of the cell. Four different tiered-SSB beam design examples are illustrated in FIG. 2 (assuming a total of 8 SSB beams for FR1), wherein each tier corresponds to a different SSB beam elevation angle, and a different elevation angle corresponds to a different coverage radius within a cell.

The first quadrant 210 is an example of 2-tier SSBs.
  a. SSB-Tier 1 (Inner SSB tier): SSB0, SSB1
  b. SSB-Tier 2 (Outer SSB tier): SSB2, SSB3, SSB4, SSB5, SSB6, SSB7

The second quadrant 240 is an example of 3-tier SSBs.
  a. SSB-Tier 1 (Inner SSB tier 1): SSB0
  b. SSB-Tier 2 (Inner SSB tier 2): SSB1, SSB2
  c. SSB-Tier 3 (Outer SSB tier): SSB3, SSB4, SSB5, SSB6, SSB7

The third quadrant 230 is a second example of 2-tier SSBs.
  a. SSB-Tier 1 (Inner SSB tier): SSB0, SSB1, SSB2, SSB3
  b. SSB-Tier 2 (Outer SSB tier): SSB4, SSB5, SSB6, SSB7

The fourth quadrant 220 is a third example of 2-tier SSBs.
  a. SSB-Tier 1 (Inner SSB tier): SSB0
  b. SSB-Tier 2 (Outer SSB tier): SSB1, SSB2, SSB3, SSB4, SSB5, SSB6, SSB7

In embodiments, the azimuth beamwidth in different tiers is configured differently. The azimuth beamwidth within each tier is nominally the same. Based on the best SSB beam reported by the UE, the gNB can identify whether the UE is the inner or outer cell region.

The azimuth direction of the UE within each SSB tier can be identified either directly via the SSB index (as exemplified in the second quadrant 240 of FIG. 2) or rely on NR CSI-RS based beam management procedure 2 (P2). For example, the beam refinement procedure P2 can be triggered for UEs in the inner SSB tier(s) that contain wide SSB beamwidth (as illustrated in the first, second and forth quadrant of FIG. 2) to help provide refined azimuth resolution to facilitate efficient radio resource management during radar coexistence.

Moreover, since airborne radar can be very far away from the gNB, with elevation angle almost equal to zero relative to the gNB, the SSB beams in the inner tier(s) can be constructed with a null in the (near) horizontal direction to alleviate the interference to the radar, irrespective of the azimuth direction of the radar.

Tiered SSB Based Uplink Radio Resource Management

In embodiments, a tiered SSB framework is used to facilitate efficient uplink radio resource measurement for radar coexistence. Below are several examples.

In a first example, a gNB employs different beam nulling methods to different UEs based on the associated SSB beam index/SSB tier. In embodiments this process is refined by the CSI-RS beam index. Example beam nulling approaches include null steering or zero-forcing.

In a further example, a gNB employs different scheduling policies to different UEs based on the associated SSB beam index/SSB tier. In embodiments this process is refined by the CSI-RS beam index.

In a further example, a gNB employs different uplink link adaptation policies to different UEs based on the associated SSB beam index/SSB tier. In embodiments this process is by the CSI-RS beam index. In embodiments, a more aggressive MCS downgrade is used for UEs in the outer SSB tier than those in the inner SSB tier(s) to enhance link robustness during radar coexistence.

In a further example, the gNB employs different uplink power control policies to different UEs based on the associated SSB beam index/SSB tier. In embodiments this process is refined by the CSI-RS beam index. In embodiments a more aggressive uplink power control policy is used for UEs in the inner SSB tier(s) than those in the outer SSB tier to improve uplink throughput during radar coexistence.

In a further example, the gNB employs different PUSCH aggregation policies to different UEs based on the associated SSB beam index/SSB tier. In embodiments this process is refined by the CSI-RS beam index. In embodiments, a more aggressive PUSCH aggregation is used for UEs in the outer SSB tier than those in the inner SSB tier(s) to enhance link robustness during radar coexistence. Examples include wherein multiple PUSCH aggregation levels are configured to the UE via RRC signaling, and wherein the active PUSCH aggregation level may be selected via either MAC-CE or DCI signaling.

Figure 3:
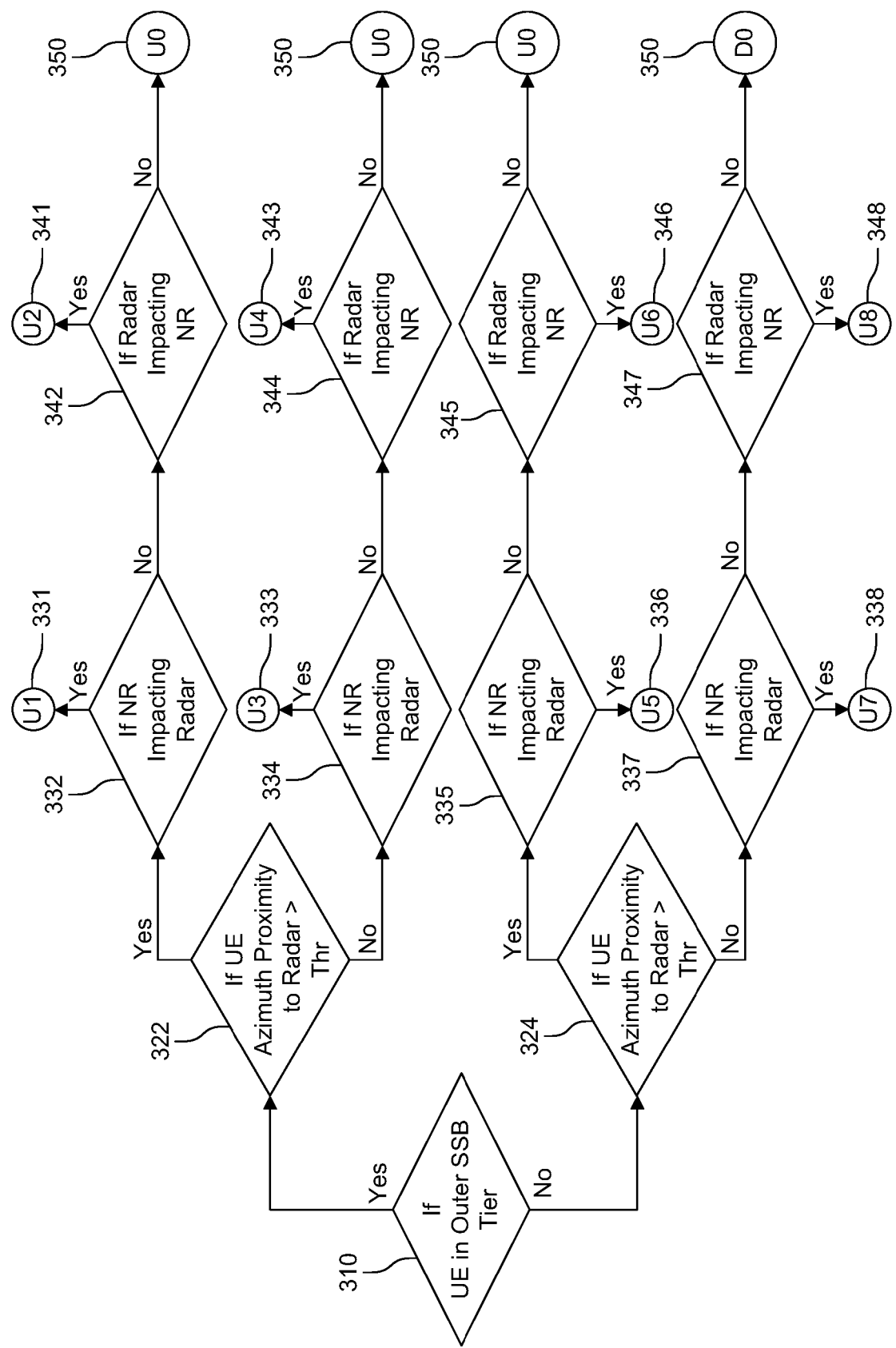
FIG. 3 is a flow diagram according to embodiments showing tiered SSB based uplink radio resource management.

A schematic diagram that utilizes the tiered SSB framework to facilitate uplink radio resource management for radar coexistence is illustrated in FIG. 3.

The conditions that determine which tier and which SSB a UE will use are shown illustrated in FIG. 3.

At a first step 310 it is determined whether the UE is in the outer SSB tier.

At a next step, either 322 or 324, depending on the outcome of step 310, it is determined whether the offset between the azimuth direction of the SSB/CSI-RS beam associated with the UE (relative to its serving gNB) and the azimuth direction of the radar (relative to the same gNB) exceeds a predetermined threshold. In embodiments, the angle of arrival (AoA) of the radar signal is estimated by either the gNB or by external sensors. In embodiments, the predetermined azimuth offset threshold is OAM configurable.

After either step 322 or 342 it is determined in steps 332, 334, 335 and 337 whether the aggregate NR interference to the radar is deemed unacceptable. In embodiments, the aggregate NR interference to the radar is estimated either by the gNB or by external sensors. In embodiments, the pathloss between the radar and gNB/Cell (including radar antenna gain) is estimated based on the received radar power on the gNB/Cell and the assumed transmit power of the radar. In embodiments, the interference from each cell of a gNB to radar is then estimated based on the transmit power, antenna pattern, geolocation of the cell, and the pathloss between each cell and the radar. In embodiments, the aggregate NR interference to the radar is estimated by summing up the interference from all the cells in the NR system that are currently "illuminated" by the radar interference. The aggregate UE interference to the radar is assumed to be no more than the aggregate gNB/Cell interference to the radar, as a gNB nominally transmits higher power than a UE. There can be many UEs in a cell, in which case they will share the PRB resources of the cell.

If the outcomes of any of steps 332, 334, 335 or 337 is that the aggregate NR interference to the radar is deemed insignificant, at steps 342, 344, 345 and 347, respectively, it is determined whether the radar interference is affecting NR system operation. In embodiments, the radar interference (e.g., power spectral density) to NR is measured either by the gNB or by external sensors. In embodiments, the measured radar power spectral density is used to estimate the radar sweeping bandwidth and to determine all the PRBs that are currently impacted by the radar (the latter may occur outside of the estimated radar sweeping bandwidth).

The measures taken depending on the outcome of the process described above and in FIG. 3, that utilize tiered SSB framework to facilitate uplink radio resource management for radar coexistence is described below.

Step U0 (350) is taken in all cases where the radar is not impacting the NR network. In this case, Normal uplink operation is performed in the absence of radar interference.

In the case where steps 310, 322 and 332 are answered Yes, Steps U1 (331) is taken and the following actions are performed: A) Restrict scheduling on uplink PRBs within the detected radar sweeping bandwidth to mitigate the possible impact of UE interference to the radar (without assuming specific UE beamforming capabilities). B) Allow the scheduling of remaining PRBs for uplink transmission. C) Apply beam nulling in the azimuth direction on the PRBs with detected radar interference to mitigate the interference from radar to the gNB if the offset between the azimuth direction of the SSB/CSI-RS beam associated with the UE (relative to its serving gNB) and the azimuth direction of the radar (relative to the same gNB) is below a second predetermined threshold. The second predetermined azimuth offset threshold can be OAM configurable. D) Apply MCS downgrade (e.g., by adding an additional SINR margin in link adaptation) to mitigate the uncertainty of radar interference timing. The additional uplink link adaptation SINR margin to be used in Step U1 (331) can be OAM configurable. E) Apply PUSCH aggregation to further mitigate the impact of radar interference. The PUSCH aggregation factor to be used in Step U1 (331) can be OAM configurable.

In the case where steps 310 and 322 are answered Yes, but step 332 is answered no, Step U2 (342) is taken and the following actions are performed: A) Allow the scheduling of any PRBs for uplink transmission. If initial transmission on PRBs within detected radar sweeping bandwidth fails, optionally retransmit the data outside of the detected radar sweeping bandwidth. B) Apply beam nulling in the azimuth direction on PRBs with detected radar interference to mitigate the interference from radar to the gNB if the offset between the azimuth direction of the SSB/CSI-RS beam associated with the UE (relative to its serving gNB) and the azimuth direction of the radar (relative to the same gNB) is below a second predetermined threshold. The second predetermined azimuth offset threshold can be OAM configurable. C) Apply MCS downgrade (e.g., by adding an additional SINR margin in link adaptation) to mitigate the uncertainty of radar interference timing. The additional uplink link adaptation SINR margin to be used in Steps U2 can be OAM configurable. D) Apply PUSCH aggregation to further mitigate the impact of radar interference. The PUSCH aggregation factor to be used in Steps U2 can be OAM configurable.

In the case where steps 310 is answered yes, step 322 is answered no and step 334 is answered yes, Step U3 (333) is taken and the following actions are performed: A) Restrict scheduling on uplink PRBs within the detected radar sweeping bandwidth to mitigate the possible impact of UE interference to the radar (without assuming specific UE beamforming capabilities) and radar interference to the gNB. B) Allow the scheduling of remaining PRBs for uplink transmission. C) Apply MCS downgrade (e.g., by adding an additional SINR margin in link adaptation) to mitigate the uncertainty of radar interference timing. The additional uplink link adaptation SINR margin to be used in Steps U3 can be OAM configurable. D) Apply possibly the highest PUSCH aggregation factor to further mitigate the impact of radar interference via time diversity. The PUSCH aggregation factor to be used in Steps U3 can be OAM configurable.

In the case where steps 310 is answered yes, step 322 is answered no and step 334 is answered no and step 344 is answered yes, step U4 (343) is taken and the following actions are performed. A) Restrict scheduling on uplink PRBs within the detected radar sweeping bandwidth to mitigate the impact of radar interference to the gNB. B) Allow the scheduling of remaining PRBs for uplink transmission. C) Apply MCS downgrade (e.g., by adding an additional SINR margin in link adaptation) to mitigate the uncertainty of radar interference timing. The additional uplink link adaptation SINR margin to be used in Steps U4 can be OAM configurable. D) Apply PUSCH aggregation to mitigate the impact of radar interference via time diversity. The PUSCH aggregation factor to be used in Steps U4 can be OAM configurable.

In the case where step 310 is answered no, step 324 is answered yes and step 335 is answered yes, step U5 (336) is taken and the following actions are performed: A) Restrict scheduling on uplink PRBs within the detected radar sweeping bandwidth to mitigate the possible impact of UE interference to the radar (without assuming specific UE beamforming capabilities). B) Allow the scheduling of remaining PRBs for uplink transmission. C) Apply beam nulling in the azimuth and/or elevation direction on the PRBs with detected radar interference to mitigate the interference from radar to the gNB if the offset between the azimuth direction of the SSB/CSI-RS beam associated with the UE (relative to its serving gNB) and the azimuth direction of the radar (relative to the same gNB) is below a second predetermined threshold. The second predetermined azimuth offset threshold can be OAM configurable. D) Apply MCS downgrade (e.g., by adding an additional SINR margin in link adaptation) to mitigate the uncertainty of radar interference timing. The additional uplink link adaptation SINR margin to be used in Steps U5 can be OAM configurable. A separate OAM parameter can be provided for each inner SSB tier when multiple inner SSB tiers are constructed. E) Instruct the UEs to transmit higher power (via TPC command) to compensate for the additional SINR margin included in link adaptation or to further improve uplink throughput. The uplink power control target SINR offset to be used in Steps U5 can be OAM configurable. A separate OAM parameter can be provided for each inner SSB tier when multiple inner SSB tiers are constructed. F) Apply PUSCH aggregation to further mitigate the impact of radar interference. The PUSCH aggregation factor to be used in Steps U5 can be OAM configurable. A separate OAM parameter can be provided for each inner SSB tier when multiple inner SSB tiers are constructed.

In the case where step 310 is answered no, step 324 is answered yes, step 335 is answered no and step 345 is answered yes. step U6 (346) is taken and the following actions are performed: A) Allow the scheduling of any PRBs for uplink transmission. If initial transmission on PRBs within detected radar sweeping bandwidth fails, optionally retransmit the data outside of the detected radar sweeping bandwidth. B) Apply beam nulling in the azimuth and/or elevation direction on PRBs with detected radar interference to mitigate the interference from radar to the gNB if the offset between the azimuth direction of the SSB/CSI-RS beam associated with the UE (relative to its serving gNB) and the azimuth direction of the radar (relative to the same gNB) is below a second predetermined threshold. The second predetermined azimuth offset threshold can be OAM configurable. C) Optionally apply MCS downgrade (e.g., by adding an additional SINR margin in link adaptation) to mitigate the uncertainty of radar interference timing. The additional uplink link adaptation SINR margin to be used in Steps U6 can be OAM configurable. A separate OAM parameter can be provided for each inner SSB tier when multiple inner SSB tiers are constructed. D) Instruct the UEs to transmit higher power (via TPC command) to compensate for the additional SINR margin included in link adaptation or to further improve uplink throughput. The uplink power control target SINR offset to be used in Steps U6 can be OAM configurable. A separate OAM parameter can be provided for each inner SSB tier when multiple inner SSB tiers are constructed. E) Optionally apply PUSCH aggregation to further mitigate the impact of radar interference. The PUSCH aggregation factor to be used in Steps U6 can be OAM configurable. A separate OAM parameter can be provided for each inner SSB tier when multiple inner SSB tiers are constructed.

In the case where step 310 is answered no, step 324 is answered no and step 337 is answered yes, step U7 (338) is taken and the following actions are performed: A) Restrict scheduling on uplink PRBs within the detected radar sweeping bandwidth to mitigate the possible impact of UE interference to the radar (without assuming specific UE beamforming capabilities). B) Allow the scheduling of remaining PRBs for uplink transmission. C) Optionally apply beam nulling in the elevation direction on the PRBs with detected radar interference to mitigate the interference from radar to the gNB if the offset between the azimuth direction of the SSB/CSI-RS beam associated with the UE (relative to its serving gNB) and the azimuth direction of the radar (relative to the same gNB) is below a second predetermined threshold. The second predetermined azimuth offset threshold can be OAM configurable. D) Apply MCS downgrade (e.g., by adding an additional SINR margin in link adaptation) to mitigate the uncertainty of radar interference timing. The additional uplink link adaptation SINR margin to be used in Steps U7 can be OAM configurable. A separate OAM parameter can be provided for each inner SSB tier when multiple inner SSB tiers are constructed. E) Instruct the UEs to transmit higher power (via TPC command) to compensate for the additional SINR margin included in link adaptation or to further improve uplink throughput. The uplink power control target SINR offset to be used in Steps U7 can be OAM configurable. A separate OAM parameter can be provided for each inner SSB tier when multiple inner SSB tiers are constructed. F) Apply PUSCH aggregation to further mitigate the impact of radar interference. The PUSCH aggregation factor to be used in Steps U7 can be OAM configurable. A separate OAM parameter can be provided for each inner SSB tier when multiple inner SSB tiers are constructed.

In the case where step 310 is answered no, step 324 is answered no, step 337 is answered no, and step 347 is answered yes, step U8 (348) is taken and the following actions are performed: A) Allow the scheduling of any PRBs for uplink transmission. If initial transmission on PRBs within detected radar sweeping bandwidth fails, optionally retransmit the data outside of the detected radar sweeping bandwidth. B) Optionally apply beam nulling in the elevation direction on PRBs with detected radar interference to mitigate the interference from radar to the gNB if the offset between the azimuth direction of the SSB/CSI-RS beam associated with the UE (relative to its serving gNB) and the azimuth direction of the radar (relative to the same gNB) is below a second predetermined threshold. The second predetermined azimuth offset threshold can be OAM configurable. C) Apply MCS downgrade (e.g., by adding an additional SINR margin in link adaptation) to mitigate the uncertainty of radar interference timing. The additional uplink link adaptation SINR margin to be used in Steps U8 can be OAM configurable. A separate OAM parameter can be provided for each inner SSB tier when multiple inner SSB tiers are constructed. D) Instruct the UEs to transmit higher power (via TPC command) to compensate for the additional SINR margin included in link adaptation or to further improve uplink throughput. The uplink power control target SINR offset to be used in Steps U8 can be OAM configurable. A separate OAM parameter can be provided for each inner SSB tier when multiple inner SSB tiers are constructed. E) Apply PUSCH aggregation to further mitigate the impact of radar interference. The PUSCH aggregation factor to be used in Steps U8 can be OAM configurable. A separate OAM parameter can be provided for each inner SSB tier when multiple inner SSB tiers are constructed.

Tiered-SSB Based Uplink Beam Nulling

In embodiments, Tiered-SSB based uplink radio resource management is implemented with tiered-SSB to facilitate efficient uplink radio resource management for radar coexistence. Beam nulling is performed toward the radar direction while pointing the main beam to the targeted UEs on any uplink scheduled PRBs that are deemed affected by the radar interference to improve uplink throughput wherein when the offset of the azimuth direction of the UE (relative to its serving gNB based on the index of the associated SSB beam, possibly refined by the CSI-RS beam) and the azimuth direction of the radar (relative to the same gNB) exceeds a predetermined low threshold but is still below a predetermined high threshold for beam nulling. For UEs in the outer SSB tier, apply beam nulling in the azimuth direction to mitigate the impact of radar interference on the gNB. For UEs in the inner SSB tier(s), apply beam nulling in the azimuth and/or elevation direction to mitigate the impact of radar interference on the gNB. When the offset of the azimuth direction of the UE (relative to its serving gNB based on the index the associated SSB beam, possibly refined by the CSI-RS beam) and the azimuth direction of the radar (relative to the same gNB) is below a predetermined low threshold for beam nulling, for UEs in the inner SSB tier(s), apply beam nulling in the elevation direction to mitigate the impact of radar interference on the gNB.

Tiered-SSB Based Uplink Scheduling

If the radar interference is deemed to affect NR system operation but the aggregate NR interference to the radar is deemed insignificant, when the offset between the azimuth direction of the UE (relative to its serving gNB based on the index of the associated SSB beam, possibly refined by the CSI-RS beam) and the azimuth direction of the radar (relative to the same gNB) exceeds a predetermined threshold, allow the scheduling of any PRBs for uplink transmission. If initial transmission on PRBs within detected radar sweeping bandwidth fails, optionally retransmit the data outside of the detected radar sweeping bandwidth. When the offset between the azimuth direction of the UE (relative to its serving gNB based on the index of the associated SSB beam, possibly refined by the CSI-RS beam) and the azimuth direction of the radar (relative to the same gNB) is below a predetermined threshold, for UEs in the inner SSB tier(s), allow the scheduling of any PRBs for uplink transmission. If initial transmission on PRBs within detected radar sweeping bandwidth fails, optionally retransmit the data outside of the detected radar sweeping bandwidth. For UEs in the outer SSB tier, restrict scheduling on uplink PRBs within detected radar sweeping bandwidth to mitigate the impact of radar interference on the gNB and allow the scheduling of remaining PRBs for uplink transmission. If the aggregate NR interference to the radar is deemed unacceptable, restrict scheduling of uplink PRBs within the detected radar sweeping bandwidth to mitigate the possible impact of UE interference on the radar (without assuming specific UE beamforming capabilities) and radar interference on the gNB and allow the scheduling of remaining PRBs for uplink transmission.

Tiered-SSB Based Uplink Power Control

In embodiments UEs are instructed to transmit extra power (via the TPC command) based on the index and tier of the SSB beam (possibly refined by the CSI-RS beam) during the period of radar coexistence.

Tiered-SSB Based PUSCH Aggregation

PUSCH aggregation may be employed for UEs based on the index and tier of their associated SSB beams (possibly refined by the CSI-RS beams) during the period of radar coexistence. Multiple PUSCH aggregation factors may be configured to the UE via RRC signaling; the active PUSCH aggregation factor may be selected via either MAC-CE or DCI signaling; and a higher PUSCH aggregation factor may be selected for UEs in the outer SSB tier than those in the inner SSB tier.

Tiered-SSB Based Uplink Link Adaptation

A more robust MCS selection, a.k.a., MCS downgrade (e.g., by including an additional SINR margin during link adaptation) may be employed for UEs based on their associated index and tier of the SSB beams (possibly refined by the CSI-RS beams) during the period of radar coexistence. A higher SINR margin may be employed for the UEs in the outer SSB tier than those in the inner SSB tier to maintain robust connectivity, as UEs in the outer SSB tier suffer much higher pathloss than those in the inner SSB tier and hence have much less power headroom, if any, to transmit extra power to overcome radar interference.

Tiered SSB Based Downlink Radio Resource Management

In embodiments, a tiered SSB framework is used to facilitate efficient downlink radio resource measurement for radar coexistence. Below are several examples.

In embodiments, the gNB employs different beam nulling methods to different UEs based on the associated SSB beam index/SSB tier, possibly refined by the CSI-RS beam index. Example beam nulling approaches may include null steering or zero-forcing.

In embodiments, the gNB employs different scheduling policies to different UEs based on the associated SSB beam index/SSB tier, possibly refined by the CSI-RS beam index.

In embodiments, the gNB employs different downlink link adaptation policies to different UEs based on the associated SSB beam index/SSB tier, possibly refined by the CSI-RS beam index. In embodiments, a more aggressive MCS downgrade is used for UEs in the outer SSB tier than those in the inner SSB tier(s) to enhance link robustness during radar coexistence.

In embodiments, the gNB employs different PDCCH aggregation policies to different UEs based on the associated SSB beam index/SSB tier, possibly refined by the CSI-RS beam index. In embodiments, A higher minimum PDCCH aggregation level is used for UEs in the outer SSB tier than those in the inner SSB tier(s) to enhance link robustness during radar coexistence.

In embodiments, the gNB employs different PDSCH aggregation policies to different UEs based on the associated SSB beam index/SSB tier, possibly refined by the CSI-RS beam index. In embodiments, a more aggressive PDSCH aggregation is used for UEs in the outer SSB tier than those in the inner SSB tier(s) to enhance link robustness during radar coexistence. In embodiments, multiple PDSCH aggregation levels are configured to the UE via RRC signaling. In embodiments, the active PDSCH aggregation level is selected via either MAC-CE or DCI signaling.

Figure 4:
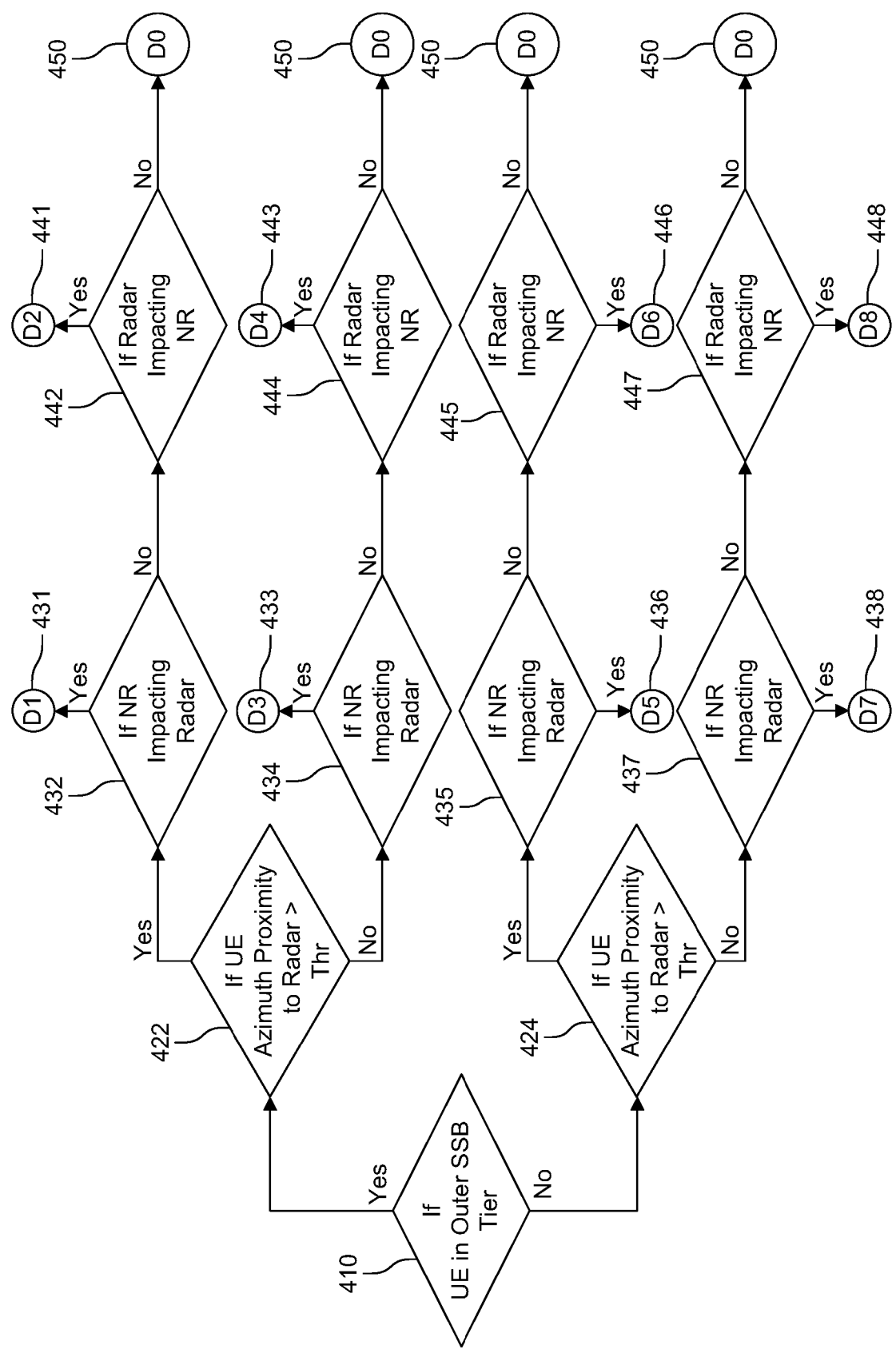
FIG. 4 is a flow diagram according to embodiments showing tiered SSB based downlink radio resource management.

A schematic diagram that utilizes the tiered SSB framework to facilitate downlink radio resource management for radar coexistence is illustrated in FIG. 4. The conditions that determine which tier and which SSB a UE will use are shown illustrated in FIG. 4 and are further elaborated as follows:

At step 410 it is determined whether the UE is in the outer SSB tier.

At steps 422 or 424, depending on the outcome of step 410, it is determined whether the offset between the azimuth direction of the SSB/CSI-RS beam associated with the UE (relative to its serving gNB) and the azimuth direction of the radar (relative to the same gNB) exceeds a predetermined threshold. In embodiments. the angle of arrival (AoA) of the radar signal is estimated by either the gNB or by external sensors. The predetermined azimuth offset threshold can be OAM configurable.

Depending on the outcome of either steps 422 or 424, at steps 432, 434, 435 and 437 it is determined whether the aggregate NR interference to the radar is deemed unacceptable. In embodiments, the aggregate NR interference to the radar may be estimated either by the gNB or by external sensors. In embodiments, the pathloss between the radar and gNB/Cell (including radar antenna gain) is estimated based on the received radar power on the gNB/Cell and the assumed transmit power of the radar. The interference from each cell of a gNB to radar can then be estimated based on the transmit power, antenna pattern, geolocation of the cell, and the pathloss between each cell and the radar. The aggregate NR interference to the radar can be estimated by the summing up the interference from all the cells in the NR system that are currently "illuminated" by the radar interference. The aggregate UE interference to the radar is assumed to be no more than the aggregate gNB/Cell interference to the radar, as a gNB nominally transmits higher power than a UE. In cases where there are many UEs in a cell, they will share the PRB resources of the cell.

If the aggregate NR interference to the radar is deemed insignificant, as evidenced by a negative result to any of steps 431, 433, 435 or 437, it is determined in steps 442, 444, 445 and 447, respectively, whether the radar interference is affecting NR system operation. The radar interference (e.g., power spectral density) to NR may be measured either by the gNB or by external sensors. In embodiments, the measured radar power spectral density is used to estimate the radar sweeping bandwidth and to determine all the PRBs that are currently impacted by the radar (the latter may occur outside of the estimated radar sweeping bandwidth).

A set of example steps, as illustrated in FIG. 4, that utilize tiered SSB framework to facilitate downlink radio resource management for radar coexistence is described below.

In the case where radar is not impacting the NR network as shown by negative outcomes to steps 442, 444, 445 and 447, step DO (450) is performed, which is normal downlink operation.

In the case where step 410 is answered yes, step 422 is answered yes and step 432 is answered yes, step D1 is taken and the following actions are performed: A) Restrict scheduling on downlink PRBs within the detected radar sweeping bandwidth to mitigate the possible impact of radar interference on the UE and gNB interference to the radar. B) Allow the scheduling of remaining PRBs for downlink transmission. C) Apply MCS downgrade (e.g., by adding an additional SINR margin in link adaptation) to mitigate the uncertainty of radar interference timing on the CSI report. The additional downlink link adaptation SINR margin to be used in Steps D1 can be OAM configurable. D) Increase PDCCH aggregation level (or enforce a minimum PDCCH aggregation level) to mitigate the uncertainty of radar interference timing on the CSI report. The minimum PDCCH aggregation level to be used in step D1 (431) can be OAM configurable. E) Apply PDSCH aggregation to further mitigate the impact of radar interference via time diversity. The PDSCH aggregation factor to be used in step D1 (431) can be OAM configurable. F) Perform beam nulling in the azimuth direction on any PRBs outside of the radar sweeping bandwidth but deemed to impact radar operation to mitigate gNB interference to the radar if the offset between the azimuth direction of the SSB/CSI-RS beam associated with the UE (relative to its serving gNB) and the azimuth direction of the radar (relative to the same gNB) is below a second predetermined threshold. The second predetermined azimuth offset threshold can be OAM configurable.

In the case where step 410 is answered yes, step 422 is answered yes, step 432 is answered no and step 442 is answered yes, step D2 (441) is taken and the following actions are performed: A) Restrict scheduling on downlink PRBs within the detected radar sweeping bandwidth to mitigate the possible impact of radar interference on the UE. B) Allow the scheduling of PRBs outside of the radar sweeping bandwidth. C) Apply MCS downgrade (e.g., by adding an additional SINR margin in link adaptation) to mitigate the uncertainty of radar interference timing on the CSI report. The additional downlink link adaptation SINR margin to be used in Steps D2 can be OAM configurable. D) Increase PDCCH aggregation level (or enforce a minimum PDCCH aggregation level) to mitigate the uncertainty of radar interference timing on the CSI report. The minimum PDCCH aggregation level to be used in Steps D2 can be OAM configurable. E) Apply PDSCH aggregation to further mitigate the impact of radar interference via time diversity. The PDSCH aggregation factor to be used in Steps D2 can be OAM configurable.

In the case where step 410 is answered yes, step 422 is answered no and step 434 is answered yes, step D3 (433) is taken and the following actions are performed: A) Restrict scheduling on downlink PRBs within the detected radar sweeping bandwidth to mitigate the impact of gNB interference on the radar and possible impact of radar interference on the UE (without assuming specific UE beamforming capabilities). B) Allow the scheduling of remaining PRBs for downlink transmission. C) Apply MCS downgrade (e.g., by adding an additional SINR margin in link adaptation) to mitigate the uncertainty of radar interference timing on the CSI report. The additional downlink link adaptation SINR margin to be used in step D3 can be OAM configurable. D) Increase PDCCH aggregation level (or enforce a minimum PDCCH aggregation level) to mitigate the uncertainty of radar interference timing on the CSI report. The minimum PDCCH aggregation level to be used in step D3 can be OAM configurable. E) Apply possibly the highest PDSCH aggregation factor to further mitigate the impact of radar interference via time diversity. The PDSCH aggregation factor to be used in step D3 can be OAM configurable.

In the case where step 410 is answered yes, step 422 is answered no, step 434 is answered no and step 444 is answered yes, step D4 (443) is taken and the following actions are performed: A) Restrict scheduling on downlink PRBs within the detected radar sweeping bandwidth to mitigate the possible impact of radar interference on the UE (without assuming specific UE beamforming capabilities). B) Allow the scheduling of any PRBs outside of radar sweeping bandwidth. C) Apply MCS downgrade (e.g., by adding an additional SINR margin in link adaptation) to mitigate the uncertainty of radar interference timing on the CSI report. The additional downlink link adaptation SINR margin to be used in Steps D4 can be OAM configurable. D) Increase PDCCH aggregation level (or enforce a minimum PDCCH aggregation level) to mitigate the uncertainty of radar interference timing on the CSI report. The minimum PDCCH aggregation level to be used in step D4 can be OAM configurable. E) Apply PDSCH aggregation to further mitigate the impact of radar interference via time diversity. The PDSCH aggregation factor to be used in step D4 can be OAM configurable.

In the case where step 410 is answered no, step 424 is answered yes and step 435 is answered yes, step D5 (436) is taken and the following actions are performed: A) Restrict scheduling on downlink PRBs within the detected radar sweeping bandwidth to mitigate the possible impact of radar interference on the UEs and gNB interference to the radar. B) Allow the scheduling of remaining PRBs for downlink transmission. C) Apply MCS downgrade (e.g., by adding an additional SINR margin in link adaptation) to mitigate the uncertainty of radar interference timing on the CSI report. The additional downlink link adaptation SINR margin to be used in step D5 can be OAM configurable. A separate OAM parameter can be provided for each inner SSB tier when multiple inner SSB tiers are constructed. D) Optionally increase PDCCH aggregation level (or enforce a minimum PDCCH aggregation level) to mitigate the uncertainty of radar interference timing on the CSI report. The minimum PDCCH aggregation level to be used in step D5 can be OAM configurable. A separate OAM parameter can be provided for each inner SSB tier when multiple inner SSB tiers are constructed. E) Apply PDSCH aggregation to further mitigate the impact of radar interference. The PDSCH aggregation factor to be used in step D5 can be OAM configurable. A separate OAM parameter can be provided for each inner SSB tier when multiple inner SSB tiers are constructed. E) Optionally perform beam nulling in the azimuth and/or elevation direction on any downlink PRBs outside of the radar sweeping bandwidth but deemed to impact radar operation to mitigate gNB interference to the radar if the offset between the azimuth direction of the SSB/CSI-RS beam associated with the UE (relative to its serving gNB) and the azimuth direction of the radar (relative to the same gNB) is below a second predetermined threshold. The second predetermined azimuth offset threshold can be OAM configurable.

In the case where step 410 is answered no, step 424 is answered yes, step 435 is answered no and step 445 is answered yes step D6 (446) is taken and the following actions are performed: A) Allow the scheduling of any PRBs for downlink transmission. If initial transmission on PRBs within detected radar sweeping bandwidth fails, optionally retransmit the data outside of the detected radar sweeping bandwidth. B) Optionally apply MCS downgrade (e.g., by adding an additional SINR margin in link adaptation) to mitigate the uncertainty of radar interference timing on the CSI report. The additional downlink link adaptation SINR margin to be used in step D6 can be OAM configurable. A separate OAM parameter can be provided for each inner SSB tier when multiple inner SSB tiers are constructed. C) Increase PDCCH aggregation level (or enforce a minimum PDCCH aggregation level) to mitigate the uncertainty of radar interference timing on the CSI report. The minimum PDCCH aggregation level to be used in step D6 can be OAM configurable. A separate OAM parameter can be provided for each inner SSB tier when multiple inner SSB tiers are constructed. D) Apply PDSCH aggregation to further mitigate the impact of radar interference. The PDSCH aggregation factor to be used in Steps D6 can be OAM configurable. A separate OAM parameter can be provided for each inner SSB tier when multiple inner SSB tiers are constructed.

In the case where step 410 is answered no, step 424 is answered no and step 437 is answered yes, step D7 (438) is taken and the following actions are performed: A) Restrict scheduling on downlink PRBs within the detected radar sweeping bandwidth to mitigate the possible impact of radar interference to the UE and gNB interference to the radar. B) Allow the scheduling of remaining PRBs for downlink transmission. C) Apply MCS downgrade (e.g., by adding an additional SINR margin in link adaptation) to mitigate the uncertainty of radar interference timing on the CSI report. The additional downlink link adaptation SINR margin to be used in step D7 can be OAM configurable. A separate OAM parameter can be provided for each inner SSB tier when multiple inner SSB tiers are constructed. D) Increase PDCCH aggregation level (or enforce a minimum PDCCH aggregation level) to mitigate the uncertainty of radar interference timing on the CSI report. The minimum PDCCH aggregation level to be used in step D7 can be OAM configurable. A separate OAM parameter can be provided for each inner SSB tier when multiple inner SSB tiers are constructed. E) Apply PDSCH aggregation to further mitigate the impact of radar interference. The PDSCH aggregation factor to be used in step D7 can be OAM configurable. A separate OAM parameter can be provided for each inner SSB tier when multiple inner SSB tiers are constructed. F) Optionally perform beam nulling in the elevation direction on any downlink PRBs outside of the radar sweeping bandwidth but deemed to impact radar operation to mitigate gNB interference to the radar if the offset between the azimuth direction of the SSB/CSI-RS beam associated with the UE (relative to its serving gNB) and the azimuth direction of the radar (relative to the same gNB) is below a second predetermined threshold. The second predetermined azimuth offset threshold can be OAM configurable.

In the case where step 410 is answered no, step 424 is answered no, step 437 is answered no and step 447 is answered yes, step D8 (448) is taken and the following actions are performed: A) Allow the scheduling of any PRBs for downlink transmission. If initial transmission on PRBs within detected radar sweeping bandwidth fails, optionally retransmit the data outside of the detected radar sweeping bandwidth. B) Optionally apply MCS downgrade (e.g., by adding an additional SINR margin in link adaptation) to mitigate the uncertainty of radar interference timing on the CSI report. The additional downlink link adaptation SINR margin to be used in steps D8 can be OAM configurable. A separate OAM parameter can be provided for each inner SSB tier when multiple inner SSB tiers are constructed. C) Optionally increase PDCCH aggregation level (or enforce a minimum PDCCH aggregation level) to mitigate the uncertainty of radar interference timing on the CSI report. The minimum PDCCH aggregation level to be used in steps D8 can be OAM configurable. A separate OAM parameter can be provided for each inner SSB tier when multiple inner SSB tiers are constructed. D) Optionally apply PDSCH aggregation to further mitigate the impact of radar interference. The PDSCH aggregation factor to be used in steps D8 can be OAM configurable. A separate OAM parameter can be provided for each inner SSB tier when multiple inner SSB tiers are constructed.

Tiered-SSB Based Downlink Beam Nulling

In embodiments, beam nulling toward the radar direction is performed while pointing the main beam to the targeted UEs on any downlink scheduled PRBs that are deemed to impact radar operation. When the offset of the azimuth direction of the UE (relative to its serving gNB based on the index of the associated SSB beam, possibly refined by the CSI-RS beam) and the azimuth direction of the radar (relative to the same gNB) exceeds a predetermined low threshold, but is still below a predetermined high threshold for beam nulling, for UEs in the outer SSB tier, apply beam nulling in the azimuth direction to alleviate the gNB interference to the radar. For UEs in the inner SSB tier(s), apply beam nulling in the azimuth and/or elevation direction to alleviate the gNB interference to the radar. When the offset between the azimuth direction of the UE (relative to its serving gNB based on the index of the associated SSB beam, possibly refined by the CSI-RS beam) and the azimuth direction of the radar (relative to the same gNB) is below a predetermined low threshold for beam nulling, for UEs in the inner SSB tier(s), apply beam nulling in the elevation direction to alleviate the gNB interference to the radar.

Tiered-SSB Based Downlink Scheduling

If the radar interference is deemed to affect NR system operation but the aggregate NR interference to the radar is deemed insignificant, for UEs in the inner SSB tier, allow the scheduling of any PRBs for downlink transmission. If initial transmission on PRBs within a detected radar sweeping bandwidth fails, in embodiments the system is configured to optionally retransmit the data outside of the detected radar sweeping bandwidth. For UEs in the outer SSB tier, in embodiments, the system is configured to restrict scheduling on downlink PRBs within detected radar sweeping bandwidth to mitigate the possible impact of radar interference on the UE (without assuming specific UE beamforming capabilities) and allow the scheduling of any PRBs outside of radar sweeping bandwidth. If the aggregate NR interference to the radar is deemed unacceptable, the system can be configured to restrict scheduling on downlink PRBs within the detected radar sweeping bandwidth to mitigate the impact of gNB interference on the radar and possible impact of radar interference on the UE (without assuming specific UE beamforming capabilities), irrespective of the tier of the SSB and allow the scheduling of remaining PRBs for downlink transmission.

Tiered-SSB Based PDCCH Aggregation

In embodiments, a PDCCH aggregation level for UEs is selected based on their associated index and tier of the SSB beams (possibly refined by the CSI-RS beams) during the period of radar coexistence. By way of example, a higher PDCCH aggregation level may be employed for the UEs in the outer SSB tier than those in the inner SSB tier and a minimum PDCCH aggregation level may be employed based on the tier of the SSB. In embodiments, a higher minimum PDCCH aggregation level is employed for the UEs in the outer SSB tier than those in the inner SSB tier.

Tiered-SSB Based PDSCH Aggregation

In embodiments, PDSCH aggregation is employed for UEs based on their associated index and tier of the SSB beams (possibly refined by the CSI-RS beams) during the period of radar coexistence wherein: multiple PDSCH aggregation factors are configured to the UE via RRC signaling; in embodiments the active PDSCH aggregation factor is selected via either MAC-CE or DCI signaling; and in embodiments a higher PDSCH aggregation factor is selected for UEs in the outer SSB tier than those in the inner SSB tier.

Tiered-SSB Based Downlink Link Adaptation

In an embodiment, a more robust MCS selection, a.k.a., MCS downgrade (e.g., by including an additional SINR margin during link adaptation) may be employed for UEs based on their associated index and tier of the SSB beams (possibly refined by the CSI-RS beams) during the period of radar coexistence wherein a higher SINR margin is employed for the UEs in the outer SSB tier than those in the inner SSB tier(s) to maintain robust connectivity, as UEs in the outer SSB tier suffer much higher pathloss than those in the inner SSB tier.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method, performed by a base station, of tiered synchronization signal block (SSB)-based radio resource management (RRM) utilizing a plurality of SSB tiers and SSB beams, wherein each SSB tier is associated with an elevation beam width, and each SSB beam is distinguished by a unique combination of SSB tier and azimuth beam width, the method comprising:
    determining that a user equipment (UE) is located in an outer SSB tier;
    detecting a presence of an interference source;
    determining an azimuth angle of the interference source;
    on a condition that a difference between the azimuth angle of the interference source and an azimuth angle of the UE does not exceed a predetermined threshold, applying a RRM scheme that includes restricting scheduling on a first set of physical resource blocks (PRBs); and
    allowing scheduling on a set of remaining PRBs.

2. The method of claim 1, wherein the interference source is a radar and the first set of PRBs is within a detected radar sweeping bandwidth.

3. The method of claim 2, wherein the RRM scheme further includes applying a modulation and coding scheme (MCS) downgrade.

4. The method of claim 2, wherein the RRM scheme further includes applying a physical uplink shared channel (PUSCH) aggregation scheme or a physical downlink shared channel (PDSCH) aggregation scheme.

5. The method of claim 2, wherein the RRM scheme further includes applying a physical uplink shared channel (PUSCH) aggregation scheme and a physical downlink shared channel (PDSCH) aggregation scheme.

6. The method of claim 2, wherein the RRM scheme further includes increasing a physical downlink control channel (PDCCH) aggregation level or setting a minimum PDCCH aggregation level.

7. The method of claim 2, wherein the RRM scheme further includes increasing a physical downlink control channel (PDCCH) aggregation level and setting a minimum PDCCH aggregation level.

8. The method of claim 2, wherein the RRM scheme further includes performing beam nulling in an elevation direction outside of the detected radar sweeping bandwidth.

9. The method of claim 2 further comprising determining that the UE is in the outer SSB tier based on an SSB beam identified by the UE.

10. The method of claim 2, further comprising instructing the UE to transmit extra power based on the index and tier of the SSB beam during a period of radar coexistence.

11. A base station comprising:
    a transceiver; and
    a processor connected to the transceiver; wherein the processor and transceiver are configured to:
    utilize a plurality of synchronization signal block SSB tiers and SSB beams, wherein each SSB tier is associated with an elevation beam width, and each SSB beam is distinguished by a unique combination of SSB tier and azimuth beam width;
    determine that a user equipment (UE) is located in an outer SSB tier;
    detect a presence of an interference source;
    determining an azimuth angle of the interference source;
    on a condition that a difference between the azimuth angle of the interference source and an azimuth angle of the UE does not exceed a predetermined threshold, apply a radio resource management RRM scheme that includes restricting scheduling on a first set of physical resource blocks (PRBs); and
    allowing scheduling on a set of remaining PRBs.

12. The base station of claim 11, wherein the interference source is a radar and the first set of PRBs is within a detected radar sweeping bandwidth.

13. The base station of claim 12, wherein the RRM scheme further includes applying a modulation and coding scheme (MCS) downgrade.

14. The base station of claim 12, wherein the RRM scheme further includes applying a physical uplink shared channel (PUSCH) aggregation scheme or a physical downlink shared channel (PDSCH) aggregation scheme.

15. The base station of claim 12, wherein the RRM scheme further includes applying a physical uplink shared channel (PUSCH) aggregation scheme and a physical downlink shared channel (PDSCH) aggregation scheme.

16. The base station of claim 12, wherein the RRM scheme further includes increasing a physical downlink control channel (PDCCH) aggregation level or setting a minimum PDCCH aggregation level.

17. The base station of claim 12, wherein the RRM scheme further includes increasing a physical downlink control channel (PDCCH) aggregation level and setting a minimum PDCCH aggregation level.

18. The base station of claim 12, wherein the RRM scheme further includes performing beam nulling in an elevation direction outside of the detected radar sweeping bandwidth.

19. The base station of claim 12 further comprising determining that the UE is in the outer SSB tier based on an SSB beam identified by the UE.

20. The base station of claim 12, further comprising instructing the UE to transmit extra power based on the index and tier of the SSB beam during a period of radar coexistence.

* * * * *